INVENTOR.
Theron John Reed
ATTORNEY

United States Patent Office 3,057,522
Patented Oct. 9, 1962

3,057,522
VARIABLE FEED AUGER FOR DELIVERY
FROM STORAGE BINS
Theron John Reed, Burr Oak, Mich.
Filed Mar. 28, 1960, Ser. No. 17,901
3 Claims. (Cl. 222—285)

This invention relates to improvements in variable feed auger for delivery from storage bins. The principal objects of this invention are:

*First.*—to provide a feed auger for withdrawing and delivering bulk materials such as grain and pellets from a bin which can operate at a constant speed and be adjusted for delivering different amounts of material at the same motor speed.

*Second.*—to provide a spiral feed auger for delivering from storage bins which is axially adjustable to project to varying distances into a sump in the bin to deliver different amounts of material.

*Third.*—to provide a relative inexpensive feed auger assembly for mounting in the base of a storage bin to withdraw and deliver varying amounts of material from the bin at a constant motor speed.

Other objects and advantages of the invention will be apparent from a consideration of the following description and claims. The drawings, of which there is one sheet, illustrate a highly practical form of the feed auger and its installation.

Figure 1:
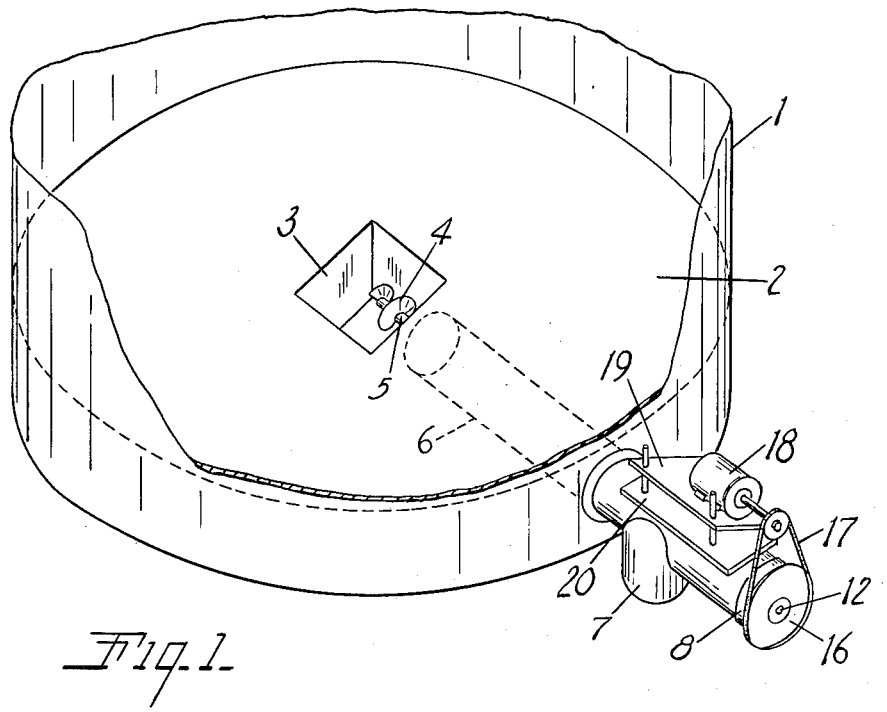
FIG. 1 is a fragmentary perspective view of the feed auger and driving motor therefor operatively installed in the base of a bin or silo.
Figure 2:
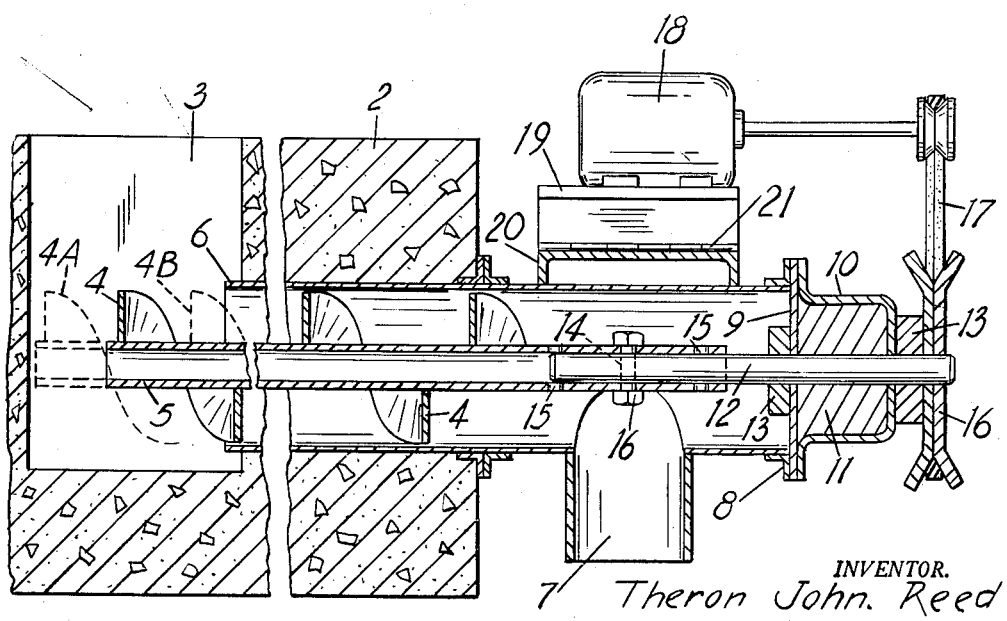
FIG. 2 is a fragmentary longitudinal cross sectional view through the axis of the auger installation shown in FIG. 1.

The drawings illustrate a cylindrical bin or silo 1 having a relatively thick circular concrete base 2 with a sump or recess 3 formed in the center thereof. A spiral feed auger 4 projects into the sump and extends radially to the side of the base for delivering bulk materials such as grain or pellets from the bin to an exterior delivery point. More specifically the spiral auger 4 is formed on and driven by a tubular auger shaft 5 which extends through a tube 6 embedded in the base and extending exteriorly therethrough. A discharge throat 7 is disclosed as projecting downwardly from the tube 6 exteriorly of the tube but this throat can be directed at other angles from the tube.

At its outer end the tube 6 is provided with a collar 8 supporting an end closure plate 9 and a bearing housing 10. The housing 10 supports a radial support bearing 11 and a short drive shaft 12 projects through the bearing and is provided with thrust bearings 13 bearing against the opposite sides of the closure plate 9 and bearing housing 10. The shaft 12 extends axially into the tube 6 to over the discharge throat 7 and is provided with a bore 14 accessible through the throat 7. The auger shaft 5 is telescopically engaged with the drive shaft 12 and is provided with a plurality of axially spaced transverse holes 15 which are selectively registerable with the hole 14 to receive a transverse drive pin or bolt 16. Adjustment of the auger shaft on the drive shaft selectively positions the inner end of the auger 4 at either the intermediate position illustrated in full lines or axially inwardly or outwardly adjusted positions indicated by the dotted lines 4A and 4B. The drive shaft 12 at all times remains in one axially adjusted position.

The outer end of the drive shaft 12 carries a pulley 16 which is connected by the belt 17 to a driving motor 18. The motor 18 is mounted on a tiltable mounting plate 19 and the mounting plate 19 is in turn pivotally or swingably connected to a base plate 20 on the projecting end of the tube 6 by means of a hinge 21.

The swingable mounting of the motor mounting plate 18 permits adjustment of the tightness of the belt 17. The motor 18 is of the constant speed type which will operate at a substantially constant speed throughout its rated capacity to rotate the drive shaft 12 and auger shaft 5 at a constant speed. By moving the auger shaft and the auger to the inwardly projected position at 4A the auger will pick up and deliver a greater amount of material from the sump 3 to the discharge throat 7. Conversely retraction of the auger from the sump will expose a lesser extent of the inner end of the auger to the material in the sump resulting in the delivery of a lesser amount to the throat 7.

The primary advantage of the structure described is that it permits economical use of a constant speed motor without expensive change speed gearing to deliver variable amounts of material from the bin 1. The adjustable driving connection between the auger shaft and the drive shaft is easily accessible through the throat 7 so that adjustment of the auger to obtain varied rates of feed is easily accomplished.

What is claimed as new is:

1. An adjustable feed conveyor for delivery from a bin comprising a bin having a thick base with a single sump in the base opening upwardly into a central area completely surrounded by storage area of the bin, a tube embedded in the base and extending between said sump and the side of said base, a downwardly directed discharge throat opening from said tube outside of said base, radial support and thrust bearings mounted at the outer end of said tube, a drive shaft mounted in said bearings and extending coaxially into said tube to opposite said throat, a constant speed motor mounted on said tube exteriorly of said base and drivingly connected to said drive shaft, said drive shaft having a transverse hole therein opposite said throat, an auger shaft telescopically engaged with said drive shaft and having a plurality of axially spaced transverse holes therein selectively registerable with the hole in said drive shaft, a connecting drive pin engaged through said hole in said drive shaft and the registering hole in said auger shaft, and a spiral screw auger on said auger shaft adapted to project varying distances into said sump depending upon the position of the connection between said shafts.

2. An adjustable feed conveyor for delivery from a bin having a thick base with a single sump in the base opening upwardly into the bin and a passage formed in the base and extending between said sump and the side of said base comprising, a tube adapted to project from the outer end of said passage, a discharge throat opening from said tube, radial support and thrust bearings mounted at the outer end of said tube, a drive shaft mounted in said bearings and extending coaxially into said tube to opposite said throat, a constant speed motor mounted on said tube and drivingly connected to said drive shaft, said drive shaft having a transverse hole therein opposite said throat, an auger shaft telescopically engaged with said drive shaft and having a plurality of axially spaced transverse holes therein selectively registerable with the hole in said drive shaft, a connecting drive pin engaged through said hole in said drive shaft and the registering hole in said auger shaft, and a spiral screw auger on said auger shaft adapted to project varying distances into said sump depending upon the position of the connection between said shafts.

3. An adjustable feed conveyor for delivery from a bin having a thick base with a single sump in the base opening upwardly into the bin and a passage formed in the base and extending between said sump and the side of said base comprising, a tube adapted to project from the outer end of said passage, a discharge throat opening from said tube, radial support and thrust bearings mounted at the outer end of said tube, a drive shaft mounted in said bearings and extending coaxially into said tube to opposite said throat, a constant speed motor mounted on said tube and drivingly connected to said drive shaft, an auger shaft telescopically engaged with said drive shaft, one of said shafts having a plurality of axially spaced transverse holes therein selectively registerable with a hole formed in the other of said shafts opposite said throat, a connecting drive pin selectively engaged through said holes, and a spiral screw auger on said auger shaft adapted to project varying distances into said sump depending upon the position of the connection between said shafts.

References Cited in the file of this patent

UNITED STATES PATENTS

| | | |
|---|---|---|
| 1,954,703 | Klein | Apr. 10, 1934 |
| 2,292,934 | Fitch | Aug. 11, 1942 |
| 2,556,392 | Hawk | June 12, 1951 |
| 2,569,039 | Berthelot | Sept. 24, 1951 |
| 2,601,049 | Neighbour | June 17, 1952 |
| 2,687,268 | Hawes | Aug. 24, 1954 |
| 2,934,224 | Puckett | Apr. 26, 1960 |